(12) United States Patent
Takahashi et al.

(10) Patent No.: US 6,703,107 B2
(45) Date of Patent: Mar. 9, 2004

(54) MAGNETIC TAPE

(75) Inventors: Masatoshi Takahashi, Kanagawa (JP); Hiroaki Doushita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 15 days.

(21) Appl. No.: 10/156,807

(22) Filed: May 30, 2002

(65) Prior Publication Data

US 2003/0017366 A1 Jan. 23, 2003

(30) Foreign Application Priority Data

May 31, 2001 (JP) ..................................... P.2001-164705
May 31, 2001 (JP) ..................................... P.2001-164706

(51) Int. Cl.$^7$ .............................................. G11B 5/708
(52) U.S. Cl. ..................... 428/141; 428/212; 428/220; 428/323; 428/336; 428/480; 428/694 BR
(58) Field of Search .................................. 428/141, 212, 428/220, 323, 336, 480, 694 BR

(56) References Cited

U.S. PATENT DOCUMENTS

| 5,904,979 A | 5/1999 | Kakuishi et al. |
| 6,228,461 B1 | 5/2001 | Sueki et al. |

FOREIGN PATENT DOCUMENTS

| JP | 8-227517 | 9/1996 |
| JP | 11-250449 | 9/1999 |
| JP | 2000-57555 | 2/2000 |

*Primary Examiner*—Stevan A. Resan
(74) *Attorney, Agent, or Firm*—Sughrue Mion, PLLC

(57) ABSTRACT

A magnetic tape is disclosed, comprising a non-magnetic support having provided on one face thereof a substantially non-magnetic layer containing a non-magnetic powder and a binder and a magnetic layer containing a ferromagnetic powder and a binder, in this order, and having provided on the other face thereof a back coat layer containing carbon black, wherein 16 projections/mm$^2$ or less of projections having an area of 30 $\mu$m$^2$ or more and a height of 40 nm or more exist on a surface of the magnetic layer.

9 Claims, No Drawings

MAGNETIC TAPE

FIELD OF THE INVENTION

The present invention relates to a magnetic tape, and particularly to a magnetic tape advantageously used for recording computer data. More particularly, the present invention relates to a magnetic tape advantageously used in a magnetic recording and reproduction system particularly using a reproducing head (MR head) of a magnetic resistance type.

BACKGROUND OF THE INVENTION

In magnetic recording and reproduction systems for recording and reproducing computer data, systems in which thin film magnetic heads are incorporated has recently come in practice. The thin film magnetic heads are easily miniaturized and processed to multi track heads, so that stationary multi track heads of the thin film magnetic heads have been frequently used, particularly in systems using magnetic tapes as recording media. The use of the thin film magnetic heads makes it possible to improve track density and recording efficiency by miniaturization to realize high-density recording, and also makes it possible to improve the transfer rate of data by the multiplication of trucks. The thin film magnetic heads can be roughly divided into induction type heads responding to changes in magnetic flux with time and magnetic resistance type heads (MR heads) utilizing a magnetic resistance effect which respond to the magnitude of magnetic flux. The induction type head has the problem that the number of turns of a head coil is small because of its planar structure, resulting in difficulty of increasing magnetomotive force to fail to obtain sufficient reproduction output. Accordingly, the MR heads which can easily obtain high reproduction output have been used for reproduction, whereas the induction type head have been used for recording. These recording and reproduction heads are usually incorporated in systems as the integral type (complex type). In the magnetic recording systems as described above, the linear recording system which can realize faster transfer of data have been employed.

As magnetic tapes for recording computer data used in the magnetic recording and reproduction systems in which the MR heads are incorporated, there are known, for example, magnetic tapes corresponding to the 3480 type, the 3490 type, the 3590 type or the 3570 type by the IBM standard. These magnetic tapes each has the basic structure that a magnetic layer of the monolayer structure having a thickness as relatively large as about 2.0 to about 3.0 μm and containing a ferromagnetic powder and a binder is provided on a support. The magnetic tapes having such magnetic layers of the monolayer structure have the problem that they can not sufficiently comply with recent needs for media which store a large amount of data.

In order to solve such a problem, for example, Japanese Patent Application (Laid-Open) No. 227517/1996 proposes a magnetic recording medium (magnetic tape) comprising a non-magnetic support, a lower non-magnetic layer provided thereon in which an inorganic non-magnetic powder is dispersed in a binder, and an upper thin magnetic layer provided thereon in which a ferromagnetic metal powder is dispersed in a binder, as a magnetic recording medium used in the magnetic recording system in which the thin film magnetic head is incorporated. A reduction in output caused by thickness loss is suppressed by thinning the upper magnetic layer (0.3 μm), and high recording density can be achieved. It becomes therefore possible to store larger amounts of data, compared to a magnetic tape having a magnetic layer of the monolayer structure. Japanese Patent Application (Laid-Open) No. 250449/1999 also discloses a magnetic tape in which a magnetic layer is similarly provided on a non-magnetic layer.

In order to realize higher recording density and larger recording capacity in the magnetic recording and reproduction systems employing the linear recording system, the recording wavelength tends to become short, and the track width in recording/reproduction of magnetic tapes tends to become narrow. The induction type heads responding to changes in magnetic flux with time, which have conventionally been used, are difficult to increase magnetomotive force, and have the problem that sufficient reproduction output can not be obtained. Accordingly, the systems in which the magnetic resistance type heads (MR heads) responding to magnetic flux and giving high reproduction output are used as the reproduction heads have spread in computer systems of the linear recording system. The MR heads are high in sensitivity compared to the induction type heads, so that the MS heads are sensitive to projections (i.e., protrusions) on the tapes. Accordingly, such projections on the magnetic layers as introduce no problem in conventional systems are liable to cause errors. It is therefore preferred that the projections on the magnetic layers of the magnetic tapes are decreased.

In large-capacity data storage tapes, not only recording and reproduction characteristics and durability but also keeping quality (i.e., storage property) is very important. There are the problems of deposition and decomposition of magnetic layer and back layer components, and deposition of oligomers in polyester supports, in storage, and the problem of cinching caused by winding squeezes of tape winding rolls. However, improvements thereof have intensively proceeded. Further, in some cases, the tapes are deformed by changes in temperature during storage. In general, such problems tend to be solved by decreasing the heat shrinkage of the magnetic tapes, but it is not sufficient yet. Further improvements have therefore been required.

SUMMARY OF THE INVENTION

An object of the present invention is to provide a magnetic tape having high recording density and suitable for a magnetic recording and reproduction system employing the linear recording system in which a magnetic resistance type reproduction head is incorporated.

In particular, another object of the present invention is to provide a magnetic tape which is not deformed even by changes in temperature during storage, and not changed in recording and reproduction characteristics after storage.

A further object of the present invention is to provide a magnetic tape excellent in durability and having high recording density, in which errors can be decreased, and recording and reproduction can be repeated with high output and high reliability, when an MR head is used.

According to further studies of the present inventors, there can be provided a magnetic tape, preferably a magnetic tape on which a signal having an areal recording density of 10 to 100 Mbit/cm$^2$ is recorded, which is decreased in errors and excellent in reproduction characteristics even when the signal having an areal recording density of 10 to 100 Mbit/cm$^2$ is recorded, by decreasing the number of projections (i.e., protrusions) having an area (i.e., an area of a part where the projection is contact with the magnetic layer surface) of 30 μm$^2$ or more and a height of 40 nm or more to 16 projections/mm$^2$ or less.

The magnetic tape of the present invention is achieved by the following means:

(1) A magnetic tape comprising a non-magnetic support having provided on one face thereof a substantially non-magnetic layer containing a non-magnetic powder and a binder and a magnetic layer containing a ferromagnetic powder and a binder, in this order, and having provided on the other face thereof a back coat layer containing carbon black, wherein 16 projections/mm$^2$ or less of projections having an area of 30 $\mu$m$^2$ or more and a height of 40 nm or more exist on a surface of the magnetic layer;

(2) The magnetic tape as described in the above (1), wherein a ratio of the thermal expansion coefficient of the magnetic tape to that of the support in a machine direction is 3 or less;

(3) The magnetic tape as described in the above (1) or (2), on which a signal having an areal recording density of 10 to 100 Mbit/cm$^2$ is recorded;

(4) The magnetic tape as described in any one of the above (1) to (3), wherein the support is a polyethylene terephthalate support;

(5) The magnetic tape as described in any one of the above (1) to (4), wherein the magnetic tape has a width ranging from 5 to 13 mm (preferably from 7 to 13 mm, and more preferably from 10 to 13 mm);

(6) The magnetic tape as described in any one of the above (1) to (5), wherein the whole thickness of the magnetic layer is within the range of 4 to 10 $\mu$m (preferably 5 to 9 $\mu$m, and more preferably 6 to 9 $\mu$m);

(7) The magnetic tape as described in any one of the above (1) to (6), wherein a servo signal is recorded along a machine direction of the magnetic tape for adjusting a relative position between a recording head and a reproduction head to a transverse direction of the magnetic tape;

(8) The magnetic tape as described in any one of the above (1) to (7), which is a magnetic tape for a magnetic recording and reproduction system using a magnetic resistance type reproduction head; and (9) The magnetic tape as described in any one of the above (1) to (8), which is a magnetic tape for recording computer data.

DETAILED DESCRIPTION OF THE INVENTION

The magnetic recording tape as of the present invention comprises a non-magnetic support having provided on one face thereof a substantially non-magnetic layer containing a non-magnetic powder and a binder and a magnetic layer containing a ferromagnetic powder and a binder, in this order, and having provided on the other face thereof a back coat layer containing carbon black, and preferably records a signal having an areal recording density of 10 to 100 Mbit/cm$^2$. The present invention is characterized by that 16 projections/mm$^2$ or less (preferably 6 projections/mm$^2$ or less, including 0) of projections having an area of 30 $\mu$m$^2$ or more and a height of 40 nm or more exist on a surface of the magnetic layer, and preferably that a ratio of the thermal expansion coefficient of the magnetic tape to that of the support in a machine direction is 3 or less (preferably 1.0 or more), and preferably 2.0 or less.

First, a method for preparing the magnetic tape of the present invention having the characteristics as described above, which are characteristic requirements, will be described. There is no particular limitation on the method for preparing the magnetic tape of the present invention. Specifically, a synthetic resin usually used as a material for a support of a magnetic tape is preferably used as a material for the support used in the present invention. When the synthetic resin is formed in film form, it is preferred that the material increased in its mechanical strength by stretching the resulting film in its transverse direction and/or machine direction is used as the support.

In the support used in the present invention, it is preferred that 100 projections/mm$^2$ or less (more preferably 35 projections/mm$^2$ or less, and still more preferably 20 projections/mm$^2$ or less) of projections exist on a side on which the magnetic layer is formed, for decreasing errors.

In the support used in the present invention, the Young's modulus thereof in its transverse direction is preferably 600 kg/mm$^2$ (5880 MPa) or more, more preferably 630 kg/mm$^2$ (6174 MPa) or more, and particularly preferably from 650 kg/mm$^2$(6370 MPa) to 700 kg/mm$^2$ (6860 MPa). The Young's modulus thereof in its machine direction is preferably 750 kg/mm$^2$ (7350 MPa) or more, and more preferably from 800 kg/mm$^2$ (7840 MPa) to 850 kg/mm$^2$ (8330 MPa).

The support used in the magnetic tape of the present invention is preferably formed of the synthetic resin film having the characteristics as described above. Such a material can be selected from materials conventionally used in magnetic tapes. In particular, a non-magnetic material is preferred. Examples of such materials include polyesters (for example, polyethylene terephthalate, polyethylene naphthalate, a mixture of polyethylene terephthalate and polyethylene naphthalate, and a copolymer containing ethylene terephthalate components and ethylene naphthalate components), polyolefins (for example, polypropylene), cellulose derivatives (for example, cellulose diacetate and cellulose triacetate), polycarbonates, polyamides (for example, an aromatic polyamide and aramid) and polyimides (for example, a fully aromatic polyimide). Of these, polyethylene naphthalate (PEN) is particularly preferred. Although there is no particular limitation on the thickness of the support, it is preferably within the range of 2.0 to 7.5 $\mu$m (more preferably from 3.0 to 7.0 $\mu$m, and particularly preferably from 4.5 to 6.5 $\mu$m).

In the magnetic tape of the present invention prepared using the support whose mechanical strength in its transverse direction and/or machine direction is properly adjusted as described above, the Young's modulus of the magnetic tape in its transverse direction is preferably 650 kg/mm$^2$ (6370 MPa) or more, more preferably 700 kg/mm$^2$ (6860 MPa) or more, and particularly preferably from 730 kg/mm$^2$ (7154 MPa) to 800 kg/mm$^2$ (7840 MPa). The Young's modulus of the magnetic tape in its machine direction is preferably 950 kg/mm$^2$ (9310 MPa) or more, more preferably 980 kg/mm$^2$ (9604 MPa) or more, and particularly preferably from 1000 kg/mm$^2$ (9800 MPa) to 1100 kg/mm$^2$ (10780 MPa).

Further, the surface roughness (Ra) of a surface of the support has an effect on the surface roughness of the magnetic layer and the back coat layer, so that the surface roughness (Ra) of the surface of the support measured by the light interference method (TOPO-3D manufactured by WYKO) is preferably 1.0 nm or less on a side on which the magnetic layer is formed. It is preferably from 3.0 to 9.0 nm, and more preferably from 3.0 to 5.0 nm, on a side on which the back coat layer is formed, namely on the opposite side.

Then, the other constituent features of the magnetic tape of the present invention will be described. First, the magnetic layer is described in detail. The magnetic layer comprises a ferromagnetic powder and a binder. Further, the magnetic layer usually contains an electrically conductive powder (for example, carbon black), an abrasive and a lubricant.

The ferromagnetic powders which can be used in the present invention include well-known ferromagnetic powders such as magnetic iron oxide $FeO_x$ (x=1.33 to 1.5), Co-modified $FeO_x$ (x=1.33 to 1.5), a ferromagnetic alloy powder mainly composed of Fe, Ni or Co (75% or more) (ferromagnetic metal powder), and a tabular hexagonal ferrite powder. In particular, the ferromagnetic alloy powder is preferably used. The ferromagnetic powder may contain at least one atom of Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B.

The ferromagnetic powder may be previously treated with a dispersing agent, a lubricant, a surfactant or an antistatic agent before dispersion. Specifically, treating methods described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973, and U.S. Pat. Nos. 3,026,215, 3,031,341, 3,100,194, 3,242,005 and 3,389,014 can be utilized. The ferromagnetic alloy powder may contain a small amount of a hydroxide or an oxide.

In the above-described ferromagnetic alloy powder, the specific surface area of particles thereof is preferably from 30 to 70 $m^2/g$, and the crystallite size determined by the X-ray diffraction method is from 5 to 30 nm. Too small the specific surface area results in failure to comply with high-density recording, whereas too large the specific surface area causes insufficient dispersion to make it impossible to form the magnetic layer having a smooth surface, similarly resulting in failure to comply with high-density recording.

The ferromagnetic alloy powder contains at least Fe. Specifically, it is a metal alloy mainly composed of Fe—Co, Fe—Zn—Ni or Fe—Ni—Co, and may be Fe alone. The saturation magnetization (saturated magnetic flux density) ($\sigma s$) of the ferromagnetic alloy powder is preferably 110 $A \cdot m^2/kg$ or more, and more preferably from 120 to 170 $A \cdot m^2/kg$, for achieving high recording density. The coercive force (Hc) is preferably from 1500 to 2500 oersteds (Oe) (from 119 to 199 kA/m), more preferably from 1700 to 2200 oersteds (from 135 to 175 kA/m), and particularly preferably from 1800 to 2100 oersteds (from 143 to 167 kA/m). The average length in the long axis of the powder determined under a transmission electron microscope is 0.15 $\mu m$ or less, and preferably from 0.01 to 0.12 $\mu m$, and the acicular ratio (the arithmetical mean value of the length in the long axis/that in the short axis) is from 3 to 12, and preferably from 4 to 10. In order to further improve the characteristics, a nonmetal such as B, C, Al, Si or P, or a salt or an oxide thereof is added to the composition in some cases. Usually, oxide layers are formed on surfaces of particles of the above-described metal powder for chemical stabilization.

Tabular hexagonal ferrite is a ferromagnetic material which is tabular and has an axis of easy magnetization in a direction perpendicular to a tabular plane. Specific examples thereof include barium ferrite (a magnetoplumbite type and a magnetoplumbite type partly containing spinel phases), strontium ferrite (a magnetoplumbite type and a magnetoplumbite type partly containing spinel phases), lead ferrite, calcium ferrite and a Co-substituted product thereof. Of these, particularly preferred are the Co-substituted product of barium ferrite and the Co-substituted product of strontium ferrite. In the present invention, tabular hexagonal ferrite containing elements such as Co—Ti, Co—Ti—Zr, Co—Ti—Zn, Ni—Ti—Zn or Ir—Zn can be used for adjustment of the coercive force.

In the tabular hexagonal ferrite powder, the tabular diameter means the width of a tabular hexagonal particle plate, and can be measured under an electron microscope. It is preferred that the tabular hexagonal ferrite powder used in the present invention has a particle size (average tabular diameter) ranging from 0.001 to 0.05 $\mu m$, a tabular ratio (arithmetical mean value of tabular diameter/tabular thickness) ranging from 2 to 10, and a specific surface area ranging from 20 to 80 $m^2/g$. From the same reason as with the ferromagnetic metal powder, too large or too small the particle size of the tabular hexagonal ferrite powder results in difficulty of achieving high-density recording. In order to achieve high recording density, the saturation magnetization $\sigma s$ of the tabular hexagonal ferrite powder is preferably 50 $A \cdot m^2/kg$ or more, and more preferably 53 $A \cdot m^2/kg$ or more. The coercive force (Hc) thereof is preferably from 1500 to 2500 oersteds (Oe) (from 119 to 199 kA/m), more preferably from 1700 to 2200 oersteds (from 135 to 175 kA/m), and particularly preferably from 1800 to 2100 oersteds (from 143 to 167 kA/m).

The water content of the ferromagnetic powder is preferably from 0.01 to 2% by weight. It is preferred that the water content is optimized depending on the kind of binder (resin). It is preferred that the pH of the ferromagnetic powder is optimized depending on the combination with a binder. It is usually from 4 to 12, and preferably from 5 to 10. At least a part of a surface of the ferromagnetic powder is preferably coated with Al, Si, P, Y or an oxide thereof as needed. The amount thereof used in the surface treatment is usually from 0.1 to 10% by weight based on the ferromagnetic powder. In such a coated ferromagnetic powder, adsorption of a lubricant such as a fatty acid is inhibited to 100 $mg/m^2$ or less, so that the desired effect can be achieved even when the amount of the lubricant added to the ferromagnetic powder is decreased. Although the ferromagnetic powder contains inorganic ions such as soluble Na, Ca, Fe, Ni and Sr in some cases, it is preferred that the content thereof is as small as possible. Usually, a content of 5000 ppm or less exerts no influence on the characteristics. The ferromagnetic powders as described above and methods for producing the same are described, for example, in Japanese Patent Application (Laid-Open) No. 22224/1995.

Carbon black is added to the magnetic layer for various purposes such as a decrease in surface electrical resistance (Rs), a reduction in the coefficient of dynamic friction, improvement in running durability and ensuring of smooth surface properties. The average particle size of the carbon black is preferably from 5 to 350 nm, and preferably from 10 to 300 nm. The specific surface area thereof is preferably from 5 to 500 $m^2/g$, and more preferably from 50 to 300 $m^2/g$. The DBP oil absorption amount is preferably from 10 to 1000 ml/100 g, and more preferably from 50 to 300 ml/100 g. The pH of the carbon black is preferably from 2 to 10, the water content is preferably from 0.1 to 10% by weight, and the tap density is preferably from 0.1 to 1 g/ml.

Carbon black obtained by various methods can be used. Examples thereof include furnace black, thermal black, acetylene black, channel black and lamp black. Specific examples of commercial products of carbon black include BLACKPEARLS 2000, 1300, 1000, 900, 800 and 700, and VULCAN XC-72 manufactured by Cabot; #35, #50, #55, #60 and #80 manufactured by Asahi Carbon Co., Ltd.; #3950B, #3750B, #3250B, #2400B, #2300B, #1000, #900,

40, #30 and #10B manufactured by Mitsubishi Chemical Corp.; CONDUCTEX SC, RAVEN 150, 50, 40 and 15 manufactured by Colombia Carbon; and Ketjen Black EC, Ketjen Black ECDJ-500 and Ketjen Black ECDJ-600 manufactured by LION AKZO CO., LTD. The amount of the carbon alack added is usually from 0.1 to 30 parts by weight, and preferably from 0.2 to 15 parts by weight, based on 100 parts by weight of the ferromagnetic powder.

The abrasives used in the magnetic layer include, for example, fused alumina, α-alumina, silicon carbide, chromium oxide ($Cr_2O_3$), corundum, artificial corundum, diamond, artificial diamond, garnet and emery (main components: corundum and magnetite). The Mohs' hardness of these abrasives is 5 or more, preferably 6 or more and particularly preferably 8 or more, and the average particle size thereof is preferably from 0.05 to 1 μm, and more preferably from 0.2 to 0.8 μm. The amount of the abrasive added is usually from 3 to 25 parts by weight, and preferably from 3 to 20 parts by weight, based on 100 parts by weight of the ferromagnetic powder.

The lubricant is added to the magnetic layer in order to decrease the friction between a surface of the magnetic layer and a magnetic head by ooze of the lubricant onto the surface of the magnetic layer, thereby keeping a sliding contact state smooth. The lubricants include, for example, fatty acids and fatty acid esters. The fatty acids include, for example, an aliphatic carboxylic acid such as acetic acid, propionic acid, 2-ethylhexanoic acid, lauric acid, myristic acid, palmitic acid, stearic acid, behenic acid, arachic acid, oleic acid, elaidic acid, linolic acid, linolenic acid or palmitoleic acid, and a mixture thereof.

Further, the fatty acid esters include, for example, various ester compounds such as butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, oleyl oleate, butoxyethyl stearate, 2-butoxy-1-propyl stearate, a product obtained by acylating dipropylene glycol monobutyl ether with stearic acid, diethylene glycol dipalmitate, a diol obtained by acylating hexamethylenediol with myristic acid and an oleate of glycerin. The fatty acids and fatty acid esters as described above can be used either alone or as a combination of two or more of them. The content of the binder is usually from 0.2 to 20 parts by weight, and preferably from 0.5 to 10 parts by weight, based on 100 parts by weight of the ferromagnetic powder.

The binders used in the magnetic layer include, for example, thermoplastic resins, thermosetting resins, reactive resins and mixtures thereof. Examples of the thermoplastic resins include polymers and copolymers containing vinyl chloride, vinyl acetate, vinyl alcohol, maleic acid, acrylic acid, an acrylic acid ester, vinylidene chloride, acrylonitrile, methacrylic acid, a methacrylic acid ester, styrene, butadiene, ethylene, vinyl butyral, vinyl acetal and vinyl ether as constituent units. The copolymers include, for example, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinylidene chloride, an acrylic acid ester-styrene copolymer, a methacrylic acid ester-acrylonitrile copolymer, a methacrylic acid ester-vinylidene chloride, a methacrylic acid ester-styrene copolymer, vinylidene chloride-acrylonitrile copolymer, a butadiene-acrylonitrile copolymer, a styrene-butadiene copolymer and a chlorovinyl ether-acrylic acid ester copolymer.

In addition to the above-described resins, polyamide resins, cellulose resins (such as cellulose acetate butylate, cellulose diacetate, cellulose propionate and nitrocellulose), polyvinyl fluoride, polyester resins, polyurethane resins and various rubber resins can also be utilized.

Further, the thermosetting resins or the reactive resins include, for example, phenolic resins, epoxy resins, hardenable polyurethane resins, urea resins, melamine resins, alkyd resins, reactive acrylic resins, formaldehyde resins, silicone resins, epoxy-polyamide resins, mixtures of polyester resins and polyisocyanate prepolymers, mixtures of polyester polyols and polyisocyanates, and mixtures of polyurethanes and polyisocyanates.

As the polyisocyanate, for example, isocyanates such as tolylene diisocyanate, 4,4'-diphenylmethane diisocyanate, hexamethylene diisocyanate, xylene diisocyanate, naphtylene-1,5-diisocyanate, o-toluidine diisocyanate, isophorone diisocyanate and triphenylmethane triisocyanate; reation products of these isocyanates and polyalcohols; and polyisocyanates produced by condensing these isocyanates are exemplified.

As the polyurethane resins, there can be used well-known polyurethanes such as polyester polyurethanes, polyether polyurethanes, polyether polyester polyurethanes, polycarbonate polyurethanes, polyester polycarbonate polyurethanes and polycaprolactone polyurethanes.

In the present invention, the binder used in the magnetic layer is preferably constituted by a combination of at least one resin selected from the group consisting of a vinyl chloride resin, a vinyl chloride-vinyl acetate copolymer, a vinyl chloride-vinyl acetate-vinyl alcohol copolymer and a vinyl chloride-vinyl acetate-maleic anhydride copolymer, with a polyurethane resin, and a combination of them with a further polyisocyanate as a curing agent.

For the binder, in order to obtain more excellent dispersibility and durability of the resulting layer, it is desirable to use one in which at least one polar group selected from —COOM, —$SO_3$M, —O$SO_3$M, —P=O $(OM)_2$, —O—P=O $(OM)_2$ (M represents a hydrogen atom or an alkali metal), —OH, —$NR_2$, —$N^+R_3$ (R represents a hydrocarbon group), an epoxy group, —SH and —CN is introduced by copolymerization or addition reaction, as needed. Such a polar group is contained preferably in an amount of $10^{-1}$ to $10^{-8}$ mol/g (more preferably in an amount of $10^{-2}$ to $10^{-6}$ mol/g).

The binder used in the magnetic layer is used in an amount ranging from 5 to 50% by weight, preferably from 10 to 30% by weight, based on 100 parts by weight of the ferromagnetic powder. When a combination of a vinyl chloride resin, a polyurethane resin and a polyisocyanate is used in the magnetic layer as the binder, it is preferred that 5 to 70% by weight of the vinyl chloride resin, 2 to 50% by weight of the polyurethane resin and 2 to 50% by weight of the polyisocyanate are contained in the whole binder.

In order to sufficiently disperse the powder such as the ferromagnetic powder or carbon black in the binder, a dispersing agent can be added to a coating solution for forming the magnetic layer. Further, a plasticizer, electrically conductive particles (antistatic agent) other than carbon black, and an antifungal agent can be added as needed. The dispersing agents which can be used include, for example, a fatty acid (RCOOH wherein R is an alkyl group having 11 to 17 carbon atoms or an alkenyl group) having 12 to 18 carbon atoms such as caprylic acid, capric acid, lauric acid, myristic acid, palmitic acid, stearic acid, behenic acid, oleic acid, elaidic acid, linolic acid, linolenic acid or stearolic acid, a metallic soap prepared from an alkali metal salt or an alkaline earth metal salt of the above-described fatty acid, a fluorine-containing compound of the above-described fatty acid ester, an amide of the above-described fatty acid, a polyalkylene oxide alkyl phosphate, lecithin, a trialkyl polyolefinoxy quaternary ammonium salt (alkyl has 1 to 5 carbon atoms, and olefin is ethylene, propylene, etc.), a sulfate and copper phthalocyanine. These may be used either alone or in combination. The dispersing agent is added in an amount ranging from 0.5 to 20 parts by weight based on 100 parts by weight of the binder.

Then, the non-magnetic layer will be described in detail. The non-magnetic layer is a substantially non-magnetic layer containing a non-magnetic powder and a binder. This non-magnetic layer is required to be substantially non-magnetic so as to exert no influence on the electromagnetic characteristics of the magnetic layer provided thereon. However, the non-magnetic layer may contain a magnetic powder without a problem, as long as it has no adverse effect on the magnetic layer. Besides these components, a lubricant is usually contained in the non-magnetic layer.

The non-magnetic powders used in the non-magnetic layer include, for example, a non-magnetic inorganic powder and carbon black. It is preferred that the non-magnetic inorganic powder is relatively hard, and the Mohs' hardness thereof is preferably 5 or more, and more preferably 6 or more. Examples of these non-magnetic inorganic powders include α-alumina, β-alumina, γ-alumina, silicon carbide, chromium oxide, cerium oxide, α-iron oxide, corundum, silicon nitride, titanium carbide, titanium dioxide, silicon dioxide, boron nitride, zinc oxide, calcium carbonate, calcium sulfate and barium sulfate. These can be used either alone or in combination. Of these, preferred are titanium dioxide, α-alumina, α-iron oxide and chromium oxide. The average particle size of the non-magnetic inorganic powder is preferably from 0.01 to 1.0 $\mu$m, more preferably from 0.01 to 0.5 $\mu$m, and particularly preferably from 0.02 to 0.1 $\mu$m.

The carbon black used in the non-magnetic layer is added for ensuring smooth surface properties of the magnetic layer formed on the non-magnetic layer, as well as for imparting electrical conductivity to the magnetic layer to prevent its electrostatic charge. As the carbon black used in the non-magnetic layer, there can be used the above-described carbon black which can be contained in the magnetic layer. However, the average particle size of the carbon black used in the non-magnetic layer is preferably 35 nm or less, and more preferably from 10 to 35 nm. The amount of the carbon black added is usually from 3 to 20 parts by weight, preferably from 4 to 18 parts by weight, and more preferably from 5 to 15 parts by weight, based on 100 parts by weight of the whole non-magnetic inorganic powder. As the lubricants used in the non-magnetic layer, there can be used the above-described fatty acids or fatty acid esters used in the magnetic layer of the magnetic tape. The amount of the lubricant added is usually from 0.2 to 20 parts by weight based on 100 parts by weight of the whole magnetic powder contained in the non-magnetic layer.

As the binders used in the non-magnetic layer, there can be used the above-described binders used in the magnetic layer. The amount of the binder added is usually from 5 to 50 parts by weight, and preferably from 10 to 30 parts by weight, based on 100 parts by weight of the whole magnetic powder contained in the non-magnetic layer. When a combination of a vinyl chloride resin, a polyurethane resin and a polyisocyanate is used in the non-magnetic layer as the binder, it is preferred that 5 to 70% by weight of the vinyl chloride resin, 2 to 50% by weight of the polyurethane resin and 2 to 50% by weight of the polyisocyanate are contained in the whole binder. The above-described dispersing agent and other additives which can be added to the magnetic layer can also be added to the non-magnetic layer.

Then, the back coat layer will be described. The back coat layer is a layer in which carbon black is mainly contained. In the back coat layer, two kinds of carbon blacks different in average particle size are preferably used in combination. In this case, fine granular carbon black having an average particle size of 10 to 30 nm and coarse granular carbon black having an average particle size of 150 to 300 nm are preferably used in combination. In general, addition of fine granular carbon black as described above allows surface electric resistance to be established low. Further, the fine granular carbon black is generally excellent in holding power of a liquid lubricant, and contributes to a reduction in the coefficient of friction when a lubricant is used in combination with it. On the other hand, the coarse granular carbon black having an average particle size of 150 to 300 nm has a function as a solid lubricant, and forms fine projections on a surface of the back layer to decrease a contact area, thereby contributing to a reduction in the coefficient of friction.

When the two kinds of carbon blacks different in average particle size are used in the back coat layer, the content ratio (weight ratio) of the fine granular carbon black having an average particle size of 10 to 30 nm to the coarse granular carbon black having an average particle size of 150 to 300 nm is preferably from 2:98 to 20:80, and more preferably from 4:96 to 15:85. The content of the carbon black in the back coat layer (when the two kinds are used, the total content thereof) is usually from 500 to 1500 parts by weight, and preferably from 800 to 1200 parts by weight, based on 100 parts by weight of a binder. As the binders used in the back coat layer, there can be used the above-described binders used in the magnetic layer. It is preferred that a nitrocellulose resin is used in combination with a polyester polyurethane resin.

In order to give running durability to the tape and enhance the strength of the back coat layer, an inorganic powder having a Mohs' hardness of 5 to 9 may be added. When the inorganic powder is used together with the carbon black, deterioration of the back coat layer in repeated sliding is reduced to give the strong back coat layer. Further, the use of the inorganic powder having a Mohs' hardness of 5 to 9 gives proper abrasive power to reduce adhesion of scratched powders to a tape guide pole.

The average particle size of the inorganic powder having a Mohs' hardness of 5 to 9 is preferably from 0.01 to 1 $\mu$m, more preferably from 0.05 to 0.5 $\mu$m, and particularly preferably from 0.08 to 0.3 $\mu$m.

The inorganic powders having a Mohs' hardness of 5 to 9 include, for example, α-iron oxide, α-alumina and chromium oxide ($Cr_2O_3$). These powders may be used either alone or in combination. Of these, preferred are α-iron oxide and α-alumina. The content of the inorganic powder having a Mohs' hardness of 5 to 9 is from 0.01 to 5 parts by weight, and preferably from 0.05 to 2 parts by weight, based on 100 parts by weight of the carbon black.

The dispersing agents described in the description of the magnetic layer can be added to the back coat layer. In the back coat layer, it is preferred that copper oleate, copper phthalocyanine and barium sulfate are used in combination as the dispersing agent. The dispersing agent is usually added in an amount ranging from 0.5 to 20 parts by weight based on 100 parts by weight of the binder.

Then, methods for producing the magnetic tape of the present invention will be briefly illustrated. The magnetic tape of the present invention can be produced by forming the non-magnetic layer and the magnetic layer on one face of the support and the back coat layer on the other face thereof in this order according to conventional methods.

The magnetic layer is preferably provided on the non-magnetic layer while the non-magnetic lay is still in a wet state. That is to say, the magnetic layer is preferably formed by utilizing a coating method according to a so-called wet-on-wet system in which after application of a coating solution for the non-magnetic layer, a coating solution for the magnetic layer is applied thereon while the coated layer formed (non-magnetic layer) is still in a wet state.

Coating methods according to the above-described wet-on wet system include, for example, the following methods:

(1) A method of first forming the non-magnetic layer on the support with a gravure coater, a roll coater, a blade coater or an extrusion coater which is generally used, and then forming the magnetic layer thereon while the non-magnetic layer is still in a wet state, using a support pressure type extrusion coater (refer to Japanese Patent Application (Laid-Open) No. 238179/1985, Japanese Patent Publication No. 46186/1989 and Japanese Patent Application (Laid-Open) No. 265672/1990);

(2) A method of almost simultaneously forming the magnetic layer and the non-magnetic layer by means of a single coating head provided with two slits for coating solutions (refer to Japanese Patent Application (Laid-Open) Nos. 88080/1988, 17921/1990 and 265672/1990); and (3) A method of almost simultaneously forming the magnetic layer and the non-magnetic layer using an extrusion coater with back-up rolls (refer to Japanese Patent Application (Laid-Open) No. 174965/1990).

In the present invention, the non-magnetic layer and the magnetic layer are preferably formed by utilizing the simultaneous multiple layer coating method to obtain a magnetic recording laminate.

The resulting magnetic recording laminate is preferably subjected to calender treatment through a calendering machine, and then, the magnetic recording laminate after the calender treatment is slit to obtain a magnetic tape. Further, when ageing treatment is conducted, it is preferred that the bulk after the calender treatment is subjected to aging treatment at a temperature of 50° C. or more for 24 hours or more, followed by rewind of the bulk and aging treatment at a temperature of 50° C. or more for 24 hours or more again.

The magnetic layer formed as described above has a surface roughness (Ra) measured by the light interference method (TOPO-3D manufactured by WYKO) of preferably 1.0 to 4 nm, more preferably 03 to 2.5 nm, and particularly preferably 0.3 to 2.2 nm.

Further, surface properties of the back coat layer tends to be transferred to the surface of the magnetic layer in a state where the tape is wound. It is therefore preferred that the back coat layer also has relatively high smoothness. The surface roughness Ra (center line average surface roughness at a cut off value of 0.08 mm) of the back coat layer of the magnetic tape of the present invention is preferably adjusted so as to be within the range of 0.0030 to 0.060 $\mu$m. Usually, the surface roughness can be controlled by the material of a calender roll, surface properties thereof and pressure used in a surface treatment process using a calender after formation of a coating film.

The non-magnetic layer of the magnetic tape of the present invention is formed to a thickness ranging preferably from 0.2 to 3.0 $\mu$m, and more preferably from 1.0 to 2.5 $\mu$m. The magnetic layer thereof is formed to a thickness ranging preferably from 0.01 to 1.0 $\mu$m, more preferably from 0.05 to 0.8 $\mu$m, still more preferably from 0.08 to 0.5 $\mu$m, and most preferably from 0.1 to 0.3 $\mu$m. The back coat layer thereof is preferably formed to a thickness ranging from 0.2 to 0.8 $\mu$m. The whole thickness of the magnetic tape of the present invention is preferably from 5 to 10 $\mu$m, more preferably from 7 to 9.5 $\mu$m, and particularly preferably from 7.5 to 9.5 $\mu$m. Although the width of the magnetic tape of the present invention varies depending on the magnetic recording and reproduction system used, it is preferably from 5 to 13 mm, more preferably from 7 to 13 mm, and particularly preferably from 10 to 13 mm, for advantageous use as a tape for recording computer data.

The magnetic tape of the present invention can be advantageously used in a magnetic recording system utilizing a linear recording system and using a reproduction MR head, especially because of a decreased occurrence of errors in reproduction of the tape. In particular, the magnetic tape of the present invention is effective in utilizing a system in which the position of a head is controlled by a servo signal. Accordingly, the servo signal is preferably recorded along a machine direction of the magnetic tape, thereby being able to improve its tracking accuracy.

There in no particular limitation on the reproduction head, and a head conventionally utilized can be used. In particular, an MR head is preferably used which is constituted so that an MR element of the shield type or the vertical type (for example, an element composed of a thin Fe/Ni alloy (permalloy) film) slides in contact with a magnetic tape.

EXAMPLES

The present invention will be described in greater detail with reference to the following examples and comparative examples, wherein all parts are by weight, unless otherwise indicated.

Examples I-1 to I-10 and Comparative Examples I-1 to I-5

[Preparation of Coating Solution for Formation of Non-Magnetic Layer and Coating Solution for Formation of Magnetic Layer]

| (Components for Formation of Non-Magnetic Layer) | |
|---|---|
| Non-magnetic powder | 90 parts |
| Titanium oxide TiO$_2$ (rutile) | |
| TiO$_2$ content: | 90% or more |
| Average primary particle size: | 0.035 $\mu$m |
| Specific surface area by the BET method: | 40 m$^2$/g |
| PH: | 7.0 |
| DEP oil absorption amount: | 27 to 38 g/100 g |
| Mohs' hardness: | 6.0 |
| Surface-covering compound (Al$_2$O$_3$): | 1.5% by weight |
| Carbon black (manufactured by Mitsubishi Carbon Co., Ltd.) | 10 parts |
| Average primary particle size: | 16 nm |
| DBP oil absorption amount: | 80 g/100 g |
| PH: | 8.0 |
| Specific surface area by the BET method: | 250 m$^2$/g |
| Volatile content: | 1.5% |
| Polar group (—SO$_3$K group, epoxy group)-containing vinyl chloride resin (MR-110 | 12 parts |

-continued

| | |
|---|---|
| manufactured by Nippon Zeon Co., Ltd.) | |
| Polar group (—SO$_3$Na group)- | 5 parts |
| containing polyester polyurethane resin | |
| Neopentyl glycol/caprolactonepolyol/ | 0.9/2.6/1 (weight ratio) |
| diphenylmethane-4,4'-diisocyanate (MDI): | |
| —SO$_3$Na group content: | 1 × 10$^{-4}$ mol/g |
| Polyisocyanate | 3 parts |
| (Coronate L manufactured by Nippon | |
| Polyurethane Co. Ltd.) | |
| Butyl stearate | 1 part |
| Stearic acid | 2 parts |
| Methyl ethyl ketone | 150 parts |
| Cyclohexanone | 50 parts |
| (Components for | |
| Formation of Magnetic Layer) | |
| Ferromagnetic metal powder | 100 parts |
| Composition Fe:Co: | 90:10 (atomic ratio) |
| Coercive force (Hc): | 1850 oersteds (Oe) |
| (147 kA/m) | |
| Specific surface area by the BET method: | 58 m$^2$/g |
| Crystallite size: | 17.5 nm |
| Saturation magnetization ($\sigma$s): | 130 emu/g |
| Particle size (length in the long axis): | 0.09 $\mu$m |
| Acicular ratio: | 7.0 |
| pH: | 8.6 |
| Water-soluble Na: | 70 ppm |
| Water-soluble Ca: | 10 ppm |
| Water-soluble Fe: | 10 ppm |
| Polar group (—SO$_3$K group)-containing | 12 parts |
| vinyl chloride copolymer (MR-100 | |
| manufactured by Nippon Zeon Co., Ltd.) | |
| —SO$_3$K group content: | 5 × 10$^{-6}$ mol/g |
| Degree of Polymerization: | 350 |
| Epoxy group content: (in monomer unit) | 3.5% by weight |
| Polar group (—SO$_3$Na group)- | 3 parts |
| containing polyester polyurethane resin | |
| Neopentyl glycol/caprolactone | 0.9/2.6/1 (weight ratio) |
| polyol/diphenylmethane-4,4'- | |
| diisocyanate (MDI): | |
| —SO$_3$Na group content: | 1 × 10$^{-4}$ mol/g |
| Polyisocyanate | 3 parts |
| (Coronate L manufactured by Nippon | |
| Polyurethane Co. Ltd.) | |
| $\alpha$-Alumina | 5 parts |
| Particle size: | 0.2 $\mu$m |
| Carbon black | 0.5 part |
| Particle size: | 0.08 $\mu$m |
| Butyl stearate | 1 part |
| Stearic acid | 2 parts |
| Methyl ethyl ketone | 150 parts |
| Cyclohexanone | 50 parts |

The components for forming each of the above-described non-magnetic layer and the magnetic layer were kneaded with a continuous kneader, and then dispersed by using a sand mill. Three parts of the above-described polyisocyanate was added to each of the resulting dispersions for the non-magnetic layer and the magnetic layer, and 40 parts of butyl acetate was further added to each dispersion, followed by filtration through a filter having an average pore size of 1 $\mu$m to prepare coating solutions for formation of the non-magnetic layer and the magnetic layer, respectively.

[Preparation of Coating Solution for Formation of Back Coat Layer]

| | |
|---|---|
| (Components for Formation of Back Coat Layer) | |
| Carbon black | 100 parts |
| Average primary particle size: | 17 nm |
| DBP oil absorption amount: | 75 g/ 100 g |

-continued

| | |
|---|---|
| (Components for Formation of Back Coat Layer) | |
| PH: | 8.0 |
| Specific surface area by the BET method: | 220 m$^2$/g |
| Volatile content: | 1.5% |
| Bulk density: | 15 lbs/ft$^3$ |
| | (240 kg/m$^3$) |
| Nitrocellulose resin | 100 parts |
| Polyester polyurethane resin | 30 parts |
| (Nippolan manufactured by Nippon | |
| Polyurethane Co. Ltd.) | |
| Dispersing agent: copper oleate | 10 parts |
| Copper phthalocyanine | 10 parts |
| Barium sulfate (sedimentary) | 5 parts |
| Methyl ethyl ketone | 500 parts |
| Toluene | 500 parts |

The above-described components were preliminarily kneaded, and kneaded with a roll mill. The following components were added to 100 parts by weight of the resulting dispersion, and dispersed with a sand grinder.

| | |
|---|---|
| Carbon black | 100 parts |
| Average primary particle size: | 200 nm |
| DBP oil absorption amount: | 36 g/ 100 g |
| PH: | 8.5 |
| Specific surface area by the BET method: | 200 m$^2$/g |
| $\alpha$-Alumina | 0.1 part |
| Particle size: | 0.2 $\mu$m |

[Supports]

Supports having characteristics shown in Table I-1 were prepared. The number of projections having an area of 30 $\mu$m$^2$ or more and a height of 40 nm or more on a side on which the magnetic layer was formed was measured in the following manner.

Any 10 portions (area: 1.875 mm$^2$) of a 2 cm×2 cm sample were observed under a differential interference microscope, and projections were marked. For the marked projections, the height and the area were measured with HD-2000 manufactured by WYKO.

Measuring conditions were as follows:

Object lens: X50, Intermediate lens: X0.5

[Preparation of Magnetic Tape for Recording Computer Data]

The resulting coating solution for formation of the non-magnetic layer and coating solution for formation of the magnetic layer were applied onto the support by simultaneous multiple layer coating so that the non-magnetic layer having a thickness of 2.1 $\mu$m after drying is formed on the magnetic layer having 0.20 $\mu$m after drying. Then, orientation treatment was conducted by using a cobalt magnet having a magnetic flux density of 0.3 T and a solenoid having a magnetic flux density of 0.15 T while both the layers were still in a wet state, followed by drying to form the non-magnetic layer and the magnetic layer.

Then, the above-described coating solution for formation of the back coat layer was applied onto the other side (the opposite side to the magnetic layer) of the support to a thickness after drying of 0.5 $\mu$m, and dried to form the back coat layer, thereby obtaining a roll of a magnetic recording laminate with the non-magnetic layer and the magnetic layer provided on one side of the support and the back coat layer provided on the other side thereof.

The resulting roll of the magnetic recording laminate was passed through a seven-step calender constituted by metal rolls alone (temperature: 90° C., line pressure: 300 kg/cm (294 kN/m) to conduct calender treatment. Then, the roll of the magnetic recording laminate after the calender treatment was slit to a width of ½ inch to obtain a magnetic tape for recording computer data (hereinafter briefly referred to a magnetic tape). The resulting magnetic tape (580 m) was wound in a 3480 type ½-inch cartridge. When "ageing treatment was conducted", the bulk after the calender treatment was subjected to aging treatment at a temperature of 60° C. for 24 hours, followed by rewind of the bulk and aging treatment at a temperature of 60° C. for 24 hours again.

[Assembly of Magnetic Recording and Reproduction System]

(1) Thin Film Magnetic Heads

Structure of a recording head: an inductive head in which a 2-turn thin film coil is held between thin film Co amorphous magnetic yokes, track width: 24 $\mu$m, gap length: 1.4 $\mu$m.

Structure of a reproduction head: a double shielded shunt bias MR (magnetic resistance type) head, track width: 10 $\mu$m, shield spacing: 1.4 $\mu$m. An MR element is a thin Fe/Ni alloy (permalloy) film.

(2) Assembly of a Magnetic Recording and Reproduction System

The recording head and the reproduction head were mounted on an F613A drive (apparatus for recording and reproducing a 3480 type ½-inch cartridge magnetic tape) manufactured by FUJITSU LTD., to fabricate a magnetic recording and reproduction system with a tape speed of 100 inches/second.

[Evaluation as Magnetic Tape]

(1) For each of the magnetic tapes obtained in Examples I-1 to I-10 and Comparative Examples I-1 to I-5 described above, the number of projections on each magnetic layer and the number of errors were measured by the following methods to evaluate characteristics of each magnetic tape.

(A) The number of projections on the magnetic layer was determined by measuring the number of projections having an area of 30 $\mu$m$^2$ or more and a height of 40 nm or more in the same manner as with the number of projections on the support.

(B) For the number of errors, a signal having a recording wavelength of 0.4 $\mu$m was recorded on the tape at a track width of 20 $\mu$m and a track number of 128, and one track was reproduced with a 90 m-long tape by use of a 10 $\mu$m-wide reproduction head under track control by servo signals according to three servo bands. A drop in output of 35% or more and lack of a signal having a length of 4 bits or more were taken as an error, and the frequency of its occurrence was measured.

Results of the above-described evaluation are shown in Table I-1.

TABLE I-1

| No. | Number of Projections on Support Area: 30 $\mu$m$^2$ or More (projections/mm$^2$) | Aging Treatment 60° C., 24 hours | Number of Projections on Magnetic Layer Area: 30 $\mu$m$^2$ or More Height: 40 nm or More (projections/mm$^2$) | Number of Errors (errors/90 nm) |
|---|---|---|---|---|
| Example I-1 | 5 | Not Conducted | 0 | 2 |
| Example I-2 | 5 | Not Conducted | 4 | 12 |
| Example I-3 | 14 | Not Conducted | 8 | 20 |
| Example I-4 | 18 | Not Conducted | 11 | 28 |
| Example I-5 | 28 | Not Conducted | 14 | 35 |
| Example I-6 | 35 | Not Conducted | 16 | 40 |
| Example I-7 | 14 | Conducted | 0 | 1 |
| Example I-8 | 40 | Conducted | 5 | 10 |
| Example I-9 | 98 | Conducted | 10 | 20 |
| Example I-10 | 200 | Conducted | 16 | 38 |
| Comparative Example I-1 | 40 | Not Conducted | 24 | 110 |
| Comparative Example I-2 | 52 | Not Conducted | 32 | 130 |
| Comparative Example I-3 | 120 | Not Conducted | 42 | 180 |
| Comparative Example I-4 | 200 | Not Conducted | 64 | 240 |
| Comparative Example I-5 | 500 | Conducted | 25 | 100 |

As is apparent from the results shown in Table I-1, the magnetic tapes within the range specified by the present invention (Examples I-1 to I-10) are decreased in the occurrence of errors and have good tracking characteristics. Accordingly, this shows that the magnetic tapes according to the present invention are suitable for a magnetic recording and reproduction system in which an MR head is incorporated.

When the number of projections on a side of the support on which the magnetic layer is formed exceeds 35 and the number of projections on the magnetic layer exceeds 16, the number of errors extremely increases (Comparative Example I-1).

Examples II-1 to II-12 and Comparative Examples II-1 to II-8

A coating solution for formation of a non-magnetic layer, a coating solution for formation of a magnetic layer, and a coating solution for formation of a back coat layer were prepared in the same manner as with Examples I-1 to I-10.
[Supports]

Supports having characteristics shown in Table II-1 were prepared. The number of projections having an area of 30 $\mu$m$^2$ or more and a height of 40 nm or more on a side on which the magnetic layer was formed was measured in the following manner.

Any 10 portions (area: 1.875 mm$^2$) of a 2 cm×2 cm sample were observed under a differential interference microscope, and projections were marked. For the marked projections, the height and the area were measured with HD-2000 manufactured by WYKO.

Measuring conditions were as follows:

Object lens: X50, Intermediate lens: X0.5

[Preparation of Magnetic Tape for Recording Computer Data]

The resulting coating solution for formation of the non-magnetic layer and coating solution for formation of the magnetic layer were applied onto the support by simultaneous multiple layer coating so that the non-magnetic layer having a thickness of 2.1 μm after drying is formed on the magnetic layer having 0.20 μm after drying. Then, orientation treatment was conducted by using a cobalt magnet having a magnetic flux density of 0.3 T and a solenoid having a magnetic flux density of 0.15 T while both the layers were still in a wet state, followed by drying to form the non-magnetic layer and the magnetic layer.

Then, the above-described coating solution for formation of the back coat layer was applied onto the other side (the opposite side to the magnetic layer) of the support to a thickness after drying of 0.5 μm, and dried to form the back coat layer, thereby obtaining a roll of a magnetic recording laminate provided with the non-magnetic layer and the magnetic layer provided on one side of the support and the back coat layer provided on the other side thereof.

The resulting roll of the magnetic recording laminate was passed through a seven-step calender constituted by metal rolls alone (temperature: 90° C., line pressure: 300 kg/cm (294 kN/m) to conduct calender treatment. Then, the roll of the magnetic recording laminate after the calender treatment was slit to a width of ½ inch to obtain a magnetic tape for recording computer data (hereinafter briefly referred to a magnetic tape). The resulting magnetic tape (580 m) was wound in a 3480 type ½-inch cartridge. When "ageing treatment was conducted", the bulk after the calender treatment was subjected to aging treatment at a temperature of 60° C. for 24 hours, followed by rewind of the bulk and aging treatment at a temperature of 60° C. for 24 hours again.

[Assembly of Magnetic Recording and Reproduction System]

(1) Thin Film Magnetic Heads

Structure of a recording head: an inductive head in which a 2-turn thin film coil is held between thin film Co amorphous magnetic yokes, track width: 24 μm, gap length: 1.4 μm.

Structure of a reproduction head: a double shielded shunt bias MR (magnetic resistance type) head, track width: 10 μm, shield spacing: 1.4 μm. An MR element is a thin Fe/Ni alloy (permalloy) film.

(2) Assembly of a Magnetic Recording and Reproduction System

The recording head and the reproduction head were mounted on an F613A drive (apparatus for recording and reproducing a 3480 type ½-inch cartridge magnetic tape) manufactured by FUJITSU LTD., to fabricate a magnetic recording and reproduction system with a tape speed of 100 inches/second.

[Evaluation as Magnetic Tape]

(1) For each of the magnetic tapes obtained in Examples II-1 to II-12 and Comparative Examples II-1 to II-8 described above, the thermal expansion coefficient, the number of projections, the number of errors and tape deformation were measured by the following methods to evaluate characteristics of each magnetic tape.

(A) Measurement of the thermal expansion coefficient:

A sample cut out of a magnetic layer to a size of 30 mm in a machine direction and 5 mm in a transverse direction was prepared. This sample was set to chucks (spaced at 15 mm) of a TMA, "TM9200" manufactured by Shinku Riko Co., Ltd, and a load of 5 gf applied thereto. After deaerated to vacuum, the inside of a furnace was replaced with nitrogen, and then the temperature was elevated at a rate of temperature increase of 1° C./minute. A change in dimension between temperatures of 32° C. and 42° C. was measured, and the thermal expansion coefficient was determined by the following equation:

The coefficient of thermal expansion=(change in dimension (mm)/sample length (15 mm)/change in temperature (10° C.))

(B) Number of projections:

The number of projections was measured in the same manner as with the number of projections on the support.

(C) Method for measuring errors:

A signal having a recording wavelength of 0.4 μm was recorded on the tape at a track width of 20 μm and a track number of 128, and one track was reproduced with a 90 m-long tape by use of a 10 μm-wide reproduction head, under track control by servo signals according to three servo bands. A drop in output of 35% or more and lack of a signal having a length of 4 bits or more were taken as an error, and the frequency of its occurrence was measured.

(D) Evaluation conditions of tape deformation:

The tape deformation was evaluated at 50° C. at 80% RH for 7 days.

A: No deformation, B: Slight distortion of the light of a fluorescent lamp fallen on a tape, C: Slight wavy deformation, D: Wavy deformation, E: Wakame seaweed-like deformation Results of the above-described evaluation are shown in Table II-1.

TABLE II-1

| No. | Number of Projections on Support Area: 30 μm² or More Height: 40 nm or More (projections/mm²) | Aging Treatment 60° C., 24 hours | Number of Projections on Magnetic Layer Area: 30 μm² or More Height: 40 nm or More (projections/mm²) | Tape/Support Thermal Expansion Coefficient Ratio | Number of Errors (errors/90 m) | Tape Deformation after Storage |
|---|---|---|---|---|---|---|
| Example II-1 | 5 | Not conducted | 0 | 1.2 | 2 | A |
| Example II-2 | 5 | Not conducted | 4 | 1.2 | 12 | A |
| Example II-3 | 10 | Not conducted | 7 | 1.2 | 14 | A |
| Example II-4 | 10 | Not conducted | 7 | 1.9 | 14 | A |
| Example II-5 | 10 | Not conducted | 7 | 2.4 | 14 | B |
| Example II-6 | 10 | Not conducted | 7 | 3.0 | 14 | C |

TABLE II-1-continued

| No. | Number of Projections on Support Area: 30 μm² or More Height: 40 nm or More (projections/mm²) | Aging Treatment 60° C., 24 hours | Number of Projections on Magnetic Layer Area: 30 μm² or More Height: 40 nm or More (projections/mm²) | Tape/Support Thermal Expansion Coefficient Ratio | Number of Errors (errors/90 m) | Tape Deformation after Storage |
|---|---|---|---|---|---|---|
| Example II-7 | 18 | Not conducted | 11 | 1.2 | 28 | A |
| Example II-8 | 28 | Not conducted | 14 | 1.2 | 35 | A |
| Example II-9 | 35 | Not conducted | 16 | 1.2 | 40 | A |
| Example II-10 | 18 | Conducted | 2 | 1.2 | 1 | A |
| Example II-11 | 40 | Conducted | 8 | 1.2 | 10 | A |
| Example II-12 | 120 | Conducted | 11 | 1.2 | 18 | A |
| Comparative Example II-1 | 40 | Not conducted | 23 | 1.2 | 110 | A |
| Comparative Example II-2 | 102 | Not conducted | 60 | 1.2 | 130 | A |
| Comparative Example II-3 | 120 | Not conducted | 78 | 1.2 | 180 | A |
| Comparative Example II-4 | 300 | Not conducted | 120 | 1.2 | 240 | A |
| Comparative Example II-5 | 10 | Not conducted | 8 | 3.5 | 11 | D |
| Comparative Example II-6 | 10 | Not conducted | 8 | 4.0 | 11 | D |
| Comparative Example II-7 | 10 | Not conducted | 8 | 4.7 | 11 | E |
| Comparative Example II-8 | 500 | Conducted | 25 | 1.2 | 100 | A |

As is apparent from the results shown in Table II-1, the magnetic tapes within the range specified by the present invention (Examples II-1 to II-12) are decreased in the occurrence of errors, decreased in tape deformation after storage and have good tracking characteristics. Accordingly, this shows that the magnetic tapes according to the present invention are suitable for a magnetic recording and reproduction system in which an MR head is incorporated.

When the number of projections on the magnetic layer exceeds 30, the number of errors extremely increases. When the ratio of the thermal expansion coefficient of the tape to that of the support exceeds 3.0, tape deformation after storage is deteriorated.

The magnetic tapes of the present invention are prepared so as to be advantageously utilized in the magnetic recording and reproduction system using the MR head, and so as to be difficult to change in dimension, particularly to environmental changes in temperature. Accordingly, even when the track width is narrowed in recording and reproduction, track deviation is difficult to occur, so that recording and reproduction can be carried out with high reliability. In particular, they can be advantageously used in the system having the function of conducting tracking control by a servo signal. Further, control of the surface roughness of the magnetic tapes causes a reduction in friction in running to improve durability, as well as inhibition of occurrence of errors. The use of the magnetic tapes of the present invention in the above-described system results in improvement of the transfer speed of data. Further, high-density recording becomes possible. As a result, large-capacity recording becomes possible. In particular, they can be advantageously used for recording computer data.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A magnetic tape comprising a non-magnetic support having provided on one face thereof a substantially non-magnetic layer containing a non-magnetic powder and a binder and a magnetic layer containing a ferromagnetic powder and a binder, in this order, and having provided on the other face thereof a back coat layer containing carbon black, wherein 16 projections/mm² or less of projections having an area of 30 μm² or more and a height of 40 nm or more exist on a surface of the magnetic layer.

2. The magnetic tape as in claim 1, wherein a ratio of the thermal expansion coefficient of the magnetic tape to that of the support in a machine direction is 3 or less.

3. The magnetic tape as in claim 1, on which a signal having an areal recording density of 10 to 100 Mbit/cm² is recorded.

4. The magnetic tape as in claim 1, wherein the support is a polyethylene terephthalate support.

5. The magnetic tape as in claim 1, wherein the magnetic tape has a width ranging from 5 to 13 mm.

6. The magnetic tape as in claim 1, wherein the whole thickness of the magnetic layer is from 4 to 10 μm.

7. The magnetic tape as in claim 1, wherein a servo signal is recorded along a machine direction of the magnetic tape for adjusting a relative position between a recording head and a reproduction head to a transverse direction of the magnetic tape.

8. The magnetic tape as in claim 1, which is a magnetic tape for a magnetic recording and reproduction system using a magnetic resistance type reproduction head.

9. The magnetic tape as in claim 1, which is a magnetic tape for recording computer data.

* * * * *